March 21, 1961   R. L. FOX ET AL   2,975,651
VEHICLE TRANSMISSION CONTROL
Filed Oct. 8, 1959   2 Sheets-Sheet 1

INVENTORS
R. L. FOX
J. O. TROEMNER
R. L. JACKLIN

INVENTORS
R. L. FOX
J. O. TROEMNER
R. L. JACKLIN

United States Patent Office 2,975,651
Patented Mar. 21, 1961

2,975,651

VEHICLE TRANSMISSION CONTROL

Richard L. Fox, Waterloo, James O. Troemner, Cedar Falls, and Roger L. Jacklin, Waterloo, Iowa, assignors to Deere & Company, Moline, Ill., a corporation of Delaware Filed Oct. 8, 1959, Ser. No. 845,222

11 Claims. (Cl. 74—473)

This invention relates to a vehicle transmission and more particularly to the control thereof, especially with respect to the operation of means for locking and releasing the transmission as respects the securing of a "park" position.

In modern vehicle transmissions, it is customary to provide, in addition to the several speed-selecting positions of a selector lever or the like, a position beyond the normal range of movement of the selector lever in which the lever actuates means in the transmission for securing a park position, which is typically obtained by locking one or more of the gears against rotation. In another form of transmission, which is disclosed and claimed in the U.S. patent of Rugen 2,839,941, the park position is obtained by means for simultaneously shifting the transmission gearing into two different speed ratios, which, of course, has the effect of locking the transmission against operation.

In most vehicles, and particularly those of the heavy type, such as tractors and the like, the park position is secured under conditions in which the vehicle may be parked on a slope or the like, in which case there is a certain amount of torque applied to the transmission parts, which makes it difficult to shift them out of park position. According to the present invention, this problem is eliminated by the provision of auxiliary means, in addition to the usual selector means, for facilitating disengagement of the parked condition of the transmission. The invention features the provision of a foot-operated auxiliary means which, alone or in conjunction with the hand-operated selector, readily enables release of the park condition of the transmission. It is a significant object to provide the auxiliary means in the form of a lever or the like which will not interfere with normal operation of the transmission, in which respect the invention features the provision of an auxiliary member which is shiftable to an operative position only when the transmission is in its locked-up or park condition. Subsidiary objects of the invention reside in the adaptability of the invention to vehicles of existing design; the adaptation of the invention to vehicles of different types, whereby the basic principles may be utilized by slight modification of the control mechanism; and such other desirable features inherent in and encompassed by the invention, as will appear from the following detailed description of a preferred embodiment of the invention, plus one modification thereof, as illustrated in the accompanying sheets of drawings, the figures of which are described below.

Figure 1:
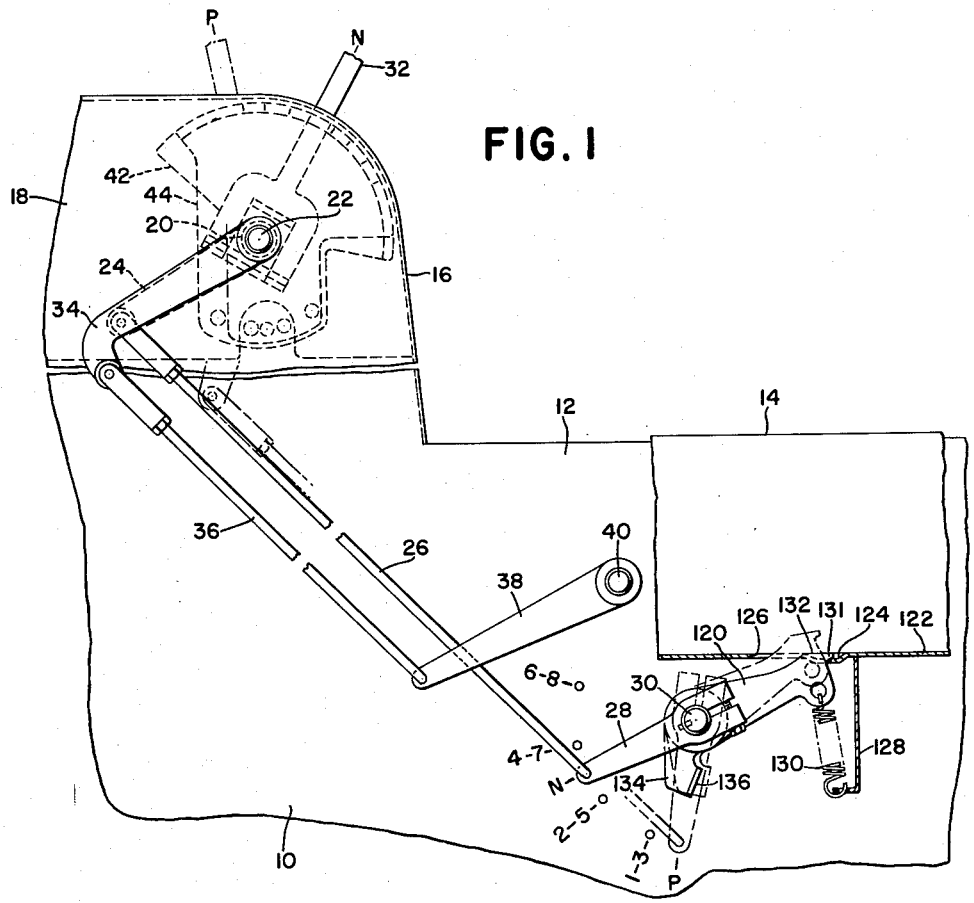
Fig. 1 is a fragmentary side elevational view of a representative vehicle installation, showing one form of the auxiliary control mechanism.

In the vehicle chosen for purposes of illustration, which may be a tractor or similar heavy duty vehicle, a main body, as at 10, may include a transmission case 12 above which is provided an operator's station 14 by means of which the operator may have convenient access to the several controls on the tractor. In the interests of clarity and brevity, controls other than those concerned with the immediate problem have been omitted. The portion of the body immediately ahead of the area designated at 14 represents what may be regarded as an instrument panel 16, which here includes additional styling or housing structure 18, and this structure, in addition to suitable supports enclosed thereby and not shown here, carries a pair of telescopic rockshafts 20 and 22. The structure is not unlike that shown in the patent identified above and therefore will be described only briefly here.

The hollow rockshaft 20 terminates axially short of the inner or solid rockshaft 22 and has keyed to its outer end an operating arm 24 which is connected by a link 26 to a shift member or arm 28 that is pivotally mounted on the body by means of a rockshaft 30. A selector lever 32 is mounted on the rockshaft assembly 20—22 in such manner as to enable selective rocking of the arm 24 which, through the link 26 and arm 28, rocks the rockshaft 30 to shift the transmission mechanism (Fig. 3) into any one of four basic speed ratios. This number of speed ratios is capable of being doubled by the provision in the transmission of range means affording high and low ranges for each of the speed ratios, and this is achieved by means of the selector lever 32 as described in the above identified patent, in which respect the lever is instrumental in causing rocking of the solid rockshaft 22, to the outer end of which is keyed an arm 34 having a linked connection 36 to an arm 38 on a second transmission-carried rockshaft 40. As is brought out in the above identified patent, the lever 32 is capable not only of fore-and-aft rocking but also of lateral shifting so as to establish selectivity between a pair of selector members 42 and 44, the former of which is keyed at its inner end to the range rockshaft 22 and the latter of which is keyed to the hollow speed-change rockshaft 20. For purposes of the present disclosure, the range characteristics of the transmission may be substantially ignored, because the principles of the invention are equally applicable to a transmission without this feature.

Figure 3:
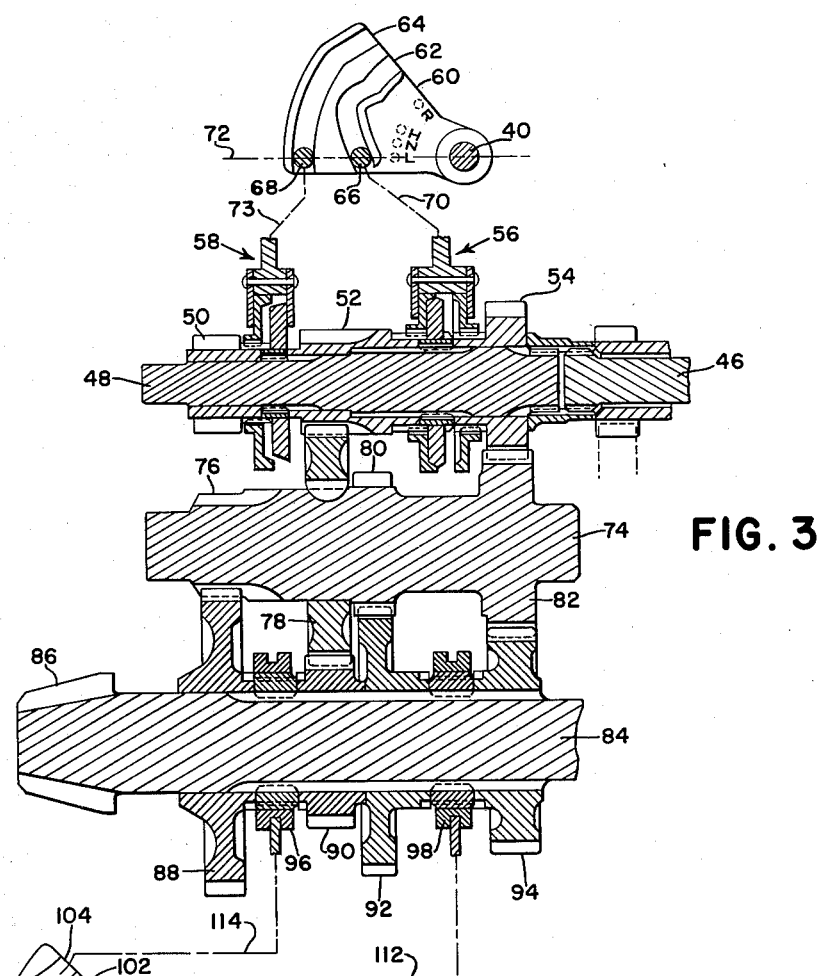
Fig. 3 is a schematic view, partly in section, of a typical transmission to which the invention is significantly applicable.

In the typical transmission shown in Fig. 3, an input shaft 46 is driven by the tractor engine (not shown) and is permanently coupled to an input shaft extension 48. The extension shaft 48 has journaled thereon a reverse pinion 50, a low-range pinion 52 and a high-range pinion 54. A high-low clutch or disengageable drive means, indicated in its entirety by the numeral 56 is shiftable selectively in opposite directions to connect one or the other of the pinions 52 and 54 to the input shaft means 46—48. For example, when the clutch 56 is shifted to the right, low-range drive is established, because the pinion 52 is positively connected to the shaft 48. Conversely, when the clutch 56 is shifted to the left, high-range drive is achieved.

A reverse clutch 58, shown in its neutral position in Fig. 3, is shiftable to the right to establish a driving connection between the shaft 48 and the pinion 50. The arrangement is, of course, such that when the high-low clutch 56 is shifted, the reverse clutch 58 remains in neutral and vice versa. This result is accomplished by the mounting on the rockshaft 40, and keyed thereto, of a cam shifter 60, having a pair of cam tracks 62 and 64 which respectively receive followers 66 and 68. The follower 66 is connected by any suitable means, represented here by the dot-dash line 70 to the clutch 56, and the configuration of the cam groove 62 is such that as the cam 60 is rocked through an arcuate range about the axis of the rockshaft 40, the follower 66 is caused to travel back and forth along a path 72 radial to the rockshaft axis. This, of course, causes shifting of the clutch 56 among its neutral, high and low positions. The same is true of the results affecting the follower 68; that is to say, the follower moves along the path 72 to shift the reverse clutch 58 via a suitable connection 73. It will be noted that the cam track 64 is arcuate about the rockshaft axis in the major portion thereof so that as shifting of the high-low clutch is obtained, the follower 68 does not move. Conversely, the opposite end of the cam track 62 is arcuate about the rockshaft axis coincident with the area in which the cam track 64 is offset from an arc about this axis, whereby when the cam 60 is rocked to obtain shifting of the reverse clutch, the high-low clutch will remain in neutral. The letters "R," "H," "N" and "L" are applied to the cam to designate positions of the cam corresponding to reverse, high, neutral and low, respectively, from which it follows that the range section of the transmission is in low, because the range or high-low clutch 56 is in its low position.

The transmission includes a countershaft 74 to which are rigidly affixed or integrally formed therewith a plurality of gears 76, 78, 80 and 82. The gears 78 and 82 are respectively in constant mesh with the pinions 52 and 54. Hence, the countershaft is a two-speed shaft, depending upon the position of the range clutch 56. A third or output shaft 84 has keyed to its rear end an output bevel pinion 86 and has journaled thereon in axially spaced relation a plurality of gears 88, 90, 92 and 94. The gear 88 is in constant mesh with the countershaft gear 76 and further is, in actual construction, in constant mesh with the reverse pinion 50 on the shaft 46—48. However, in the interests of clarity, the three shafts are shown in displaced position so as to illustrate the gearing in a better manner. The output shaft 90 is in constant mesh with the countershaft gear 78; the output shaft gear 92 is in constant mesh with the countershaft gear 80; and the output shaft gear 94 is in constant mesh with the countershaft gear 82. However, since the several output shaft gears are journaled on the output shaft, the transmission is incapable of transmitting torque unless these gears are selectively connected to the shaft. For this purpose, the shaft carries a pair of speed-change clutches 96 and 98. The clutch 96 is shiftable selectively to the left or to the right. When shifted to the left, it establishes a speed ratio which will, in this particular transmission, produce either first or third speed forward, depending upon the position of the range clutch 56; that is to say, if the range clutch 56 is in its low position, and the speed clutch 96 is shifted to the left, the transmission will drive in first speed forward. With the clutch 96 still to the left, as assumed, and the range clutch 56 shifted to the left, the transmission will drive in third speed forward. The clutch 96 may be shifted to the right to connect the shaft 84 to the gear 90, in which case the transmission is capable of producing either sixth or eighth speeds forward, depending upon the position of the range clutch 56.

The clutch 98 is likewise shiftable selectively to the left or to the right. When shifted to the left, it couples the gear 92 to the output shaft 84 and will produce second or fifth speed forward, depending upon the position of the range clutch 56. When shifted to the right, it will produce fourth or seventh speeds forward, depending upon the position of the range clutch 56.

Shifting of the clutches 96 and 98 is accomplished by a second cam 100. This cam is keyed to the previously described rockshaft 30 and is provided with a pair of cam grooves 102 and 104 having the configuration illustrated to cause shifting of a pair of followers 106 and 108 in such manner, relative to a path 110 radial to the rockshaft 30, as to produce the several speeds indicated.

The concentric and offset parts of the cam grooves 102 and 104, as related in the above-identified patent, are such that normally the clutches 96 and 98 are shifted individually; that is, when one clutch is shifted, the other is retained in neutral position. However, in the present case, there is an exception to this situation, which is utilized to achieve a park or locked-up condition in the transmission. The followers 106 and 108 are connected by any suitable means, such as indicated by the broken lines 112 and 114, to the clutches 96 and 98. The numerals on the cam 100 represent the several positions or speed ratios obtainable; viz., 6–8, 4–7, N, 2–5, 1–3, and P, the latter indicating the park position of the shift member or cam 100.

Figure 4:
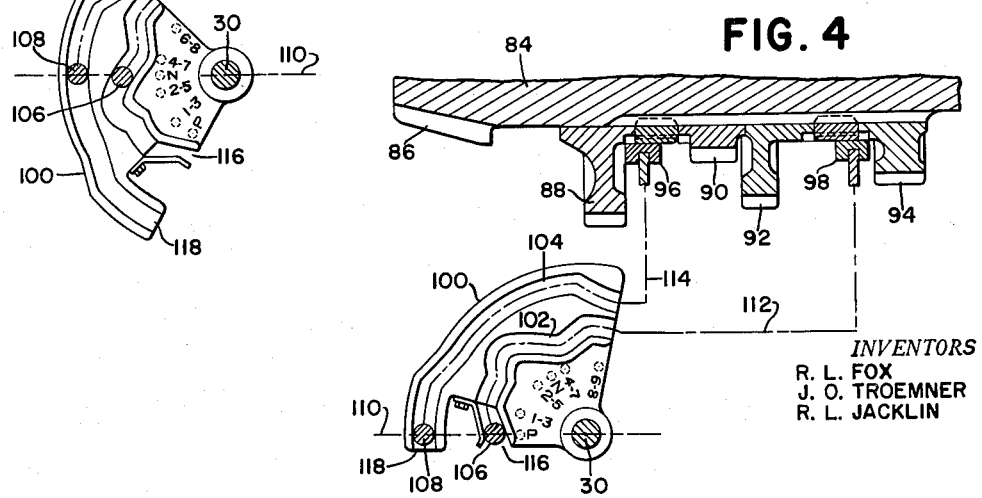
Fig. 4 is a view of a portion of the transmission shown in Fig. 3, with the shiftable elements shifted in such manner as to secure the park condition.

In Fig. 3, the position of the cam 100 is such that both the followers 106 and 108 are in neutral positions, which means, of course, that the two clutches 96 and 98 are in neutral positions. In Fig. 4, the position of the cam 100 is representative of its park position, in which case both followers 106 and 108 are out of their neutral positions. In this particular case, the mechanical result is that the clutch 96 is shifted to the left and the clutch 98 is shifted to the right, thus coupling the shaft 84 simultaneously to the gears 88 and 94. Because of the difference in speed ratios, and because the two gears 98 and 94 are in constant mesh with the gears 76 and 82 rigid on the countershaft 74, the transmission becomes locked up and thus this condition is exploited for the purpose of securing the parked position. The manner in which the two followers 106 and 108 are simultaneously moved is best illustrated in Fig. 4, wherein it will be seen that the configuration of the cam tracks 102 and 104, in their lower portions, as at 116 and 118, is such as to create a result that departs from the principle of designing the cam tracks so that one follower will move while the other remains in its neutral position. The fundamentals behind this design are explained in the patent identified above. If the range clutch 56 is in its low position and the clutches 96 and 98 are selectively operated during normal conditions, the transmission is capable of producing four speeds forward; namely first, second, fourth and sixth. With the range clutch 56 in its high position, the four speeds forward will be third, fifth, seventh and eighth. The manner in which the reverse speeds are achieved is immaterial, but suffice it to say that when the reverse clutch is engaged, the reverse speed ratios will be equivalent to first, second, fourth and sixth. In some conditions, sixth speed in reverse may be too high and means may be provided for locking this speed out of operative conditions. Here again, that is a detail that is not material to the present invention.

As previously indicated, the locked-up or park condition of the transmission often presents a situation in which it is extremely difficult to disengage the clutches 96 and 98 from their Fig. 4 positions merely by use of the hand selector lever 32, primarily because the parked condition of the tractor will be such as to create considerable "wind-up" in the shaft. According to the present invention, this problem is eliminated by the provision of auxiliary means in the form of an actuator lever 120 which is loosely mounted on the rock-shaft 30 adjacent to the keyed arm 28. The operator's station 14 includes a depending support or platform portion 122 which may be depressed at 124 and provided with an aperture at 126. A depending ear 128 provides means for anchoring one end of a spring 130, the other end of which is connected to the actuator 120 and thus establishes biasing means for resiliently retaining the actuator 120 in what may be regarded as an idle position. This position is attained or limited by stop means including a nose 131 on an upper or force-receiving portion 132 of the actuator. In the idle position of the actuator, as shown in full lines in Fig. 1, the force-receiving portion 132 does not project above the general level of the platform part 122.

Figure 2:
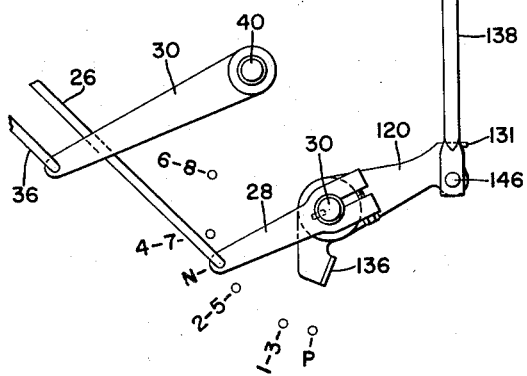
Fig. 2 is a fragmentary view showing a modified form of structure embodied in Fig. 1.

As previously described, the shift member 28 and actuator 120 are mounted side-by-side on the rockshaft 30, the latter being loose on the shaft. The actuator includes an integral arm 134 on which is formed an outstanding lug 136 engageable at times with the proximate edge of the shift member 28. As best shown in full lines, the position of the actuator 120, and particularly the position of its lug 136, is such that the member 28 may have first-range movement through the arcuate range established between the 1-3 and the 6-8 position, without interference from the actuator 120. However, when the member 28 is moved to the 1-3 position, it engages the lug 136. To achieve the park position, the operator moves the selector lever 32 farther forwardly to the broken-line position identified at "P" in Fig. 1, which results in second-range movement of the member 28, since it moves to a park position beyond the 1-3 position. Considered broadly, the member 28 may be regarded as being movable between a first position (neutral) and a second position (1-3) and to a third position (park) beyond the second or 1-3 position. When the member 28 is moved to the park position, it picks up the actuator 120 via the one-way force-transmitting connection established by the lug 136, causing the actuator 120 to rock in a counter-clockwise direction so that its force-receiving portion 132 is projected above the level of the platform or support portion 122, as seen in broken lines in Fig. 1. Now, if the operator finds it difficult to release the transmission from its park condition merely by means of the selector lever 32, he may step down with his foot on the actuator 120, returning same from the operative position (broken lines, Fig. 1) to the idle position (full lines, Fig. 1). As previously indicated, the nose 131 engages the platform portion at 124 to establish a stop limiting movement of the actuator 120 to its idle position when returned from its operative position. Then, with the transmission released from its park condition, the member 28 may have full first-range movement (between 1-3 and 6-8) clear of or without interference from the actuator 120. In other words, the actuator 120 is caused to move to its operative position only when the transmission is shifted into its park condition. The modification shown in Fig. 2 includes the basic structure previously described, but is modified by an extension part 138, which is utilized in connection with a platform 140 which is of a different style and occupies a higher position than the platform portion 122. Here again, the fundamental principles are followed, and in this case the platform portion 140 is depressed at 142 and apertured at 144 to guide the upper portion of the extension part 138, the lower end of which is pivotally connected at 146 to the actuator 120. In this case, the connection at 146 is effected through the same hole to which the spring 130 is connected in Fig. 1. The spring 130 is replaced by a compression spring 148 which encircles the upper portion of the extension part or rod 138 and which acts against the underside of the platform portion 140 and reacts against a stop collar 150 on the rod. A snap ring or washer, as at 152, at the upper end of the rod 138 establishes a stop for limiting movement of the actuator 120 to its idle position when returned from its operative position. As will be clear, when the member 28 is moved to the park position, it picks up the actuator 120 via the lug 136, so as to cause the upper end of the extension rod 138 to project above the platform portion 140. Here again, the upper end is a force-receiving means or portion capable of receiving force from the operator as he steps down on the rod to force the actuator back to its idle position, during which range of movement it of course picks up the member 28 and moves it from the park position to the 1-3 position. Here, as in the case of the structure shown in Fig. 1, the clutch 98 is returned to neutral, even though the clutch 96 remains in its 1-3 position. This is sufficient to remove the stresses in the locked-up transmission and shifting thereof to any neutral condition, enabling starting of the tractor, or the like, can be readily achieved.

Both forms of the invention are relatively simple and the design thereof is such that they may be incorporated in forms of the transmission control illustrated in the above identified patent. With minor changes, the constructions may be adapted to other transmissions. Features and advantages other than those enumerated herein will readily occur to those versed in the art, as will modifications and alterations in the preferred embodiments disclosed, all of which may be achieved without departure from the spirit and scope of the invention.

What is claimed is:

1. In a vehicle having a body and a change-speed transmission having a pair of shiftable elements, each capacitated to produce a driving speed ratio, a shift member mounted on the body for first-range movement from a first position to a second position to shift one element to produce one ratio and for second-range movement to a park position beyond said second position for shifting both elements to produce both ratios for locking the transmission against operation, and a shift controller movable on the body and connected to and for selectively moving said member among said positions, the combination with said member of an actuator carried by the body for movement between idle and operative positions; means providing a one-way connection between the shift member and the actuator and effective to transmit force from said member to said actuator only when the member is moved to its park position so as to cause said actuator to move to its operative position, and said one-way connection means being effective in the opposite direction to transmit force from the operatively positioned actuator to the park-positioned member whereby said actuator is operative, when forcibly returned to idle position, to shift the member out of its park position and back to its second position; means limiting movement of the actuator to its idle position when returned thereto from its operative position so as to retain said actuator clear of first-range movement of the member; and means biasing the actuator to its idle position.

2. The invention defined in claim 1, including: a support portion on the body having an aperture therein; force-receiving means connected to the actuator and projectible through said aperture in the operative position of said actuator so as to facilitate manual operation of the actuator.

3. The invention defined in claim 2, in which: the force-receiving means is a rigid part of the actuator.

4. The invention defined in claim 2, in which: the force-receiving means is an extension part linked to the actuator and guided by the aperture.

5. The invention defined in claim 4, in which: the means biasing the actuator to its idle position includes a spring acting on the extension part and reacting on the support portion.

6. The invention defined in claim 1, in which: the shift member is a lever pivoted on the body; the actuator is a lever pivoted on the body coaxially with the shift member; and the one-way connection means includes interengageable portions respectively on the actuator and the shift member.

7. In a vehicle having a body and a change-speed transmission having a pair of shiftable elements, each capacitated to produce a driving speed ratio, a shift member mounted on the body for first-range movement from a first position to a second position to shift one element to produce said ratio and for second-range movement to a park position beyond said second position for shifting both elements to produce both ratios for locking the transmission against operation, and a shift controller movable on the body and connected to and for selectively moving said member among said positions, the combination with said member of an auxiliary release means mounted on the body and connected to the shift member for receiving manual force to move said member out of its park position.

8. The invention defined in claim 7, including: means limiting movement of the auxiliary release means to range outside the first and second positions of said shift member.

9. In a vehicle having a body and a change-speed transmission having a pair of shiftable elements, each capacitated to produce a driving speed ratio, a shift member mounted on the body for first-range movement from a first position to a second position to shift one element to produce said ratio and for second-range movement to a park position beyond said second position for shifting both elements to produce both ratios for locking the transmission against operation, and a shift controller movable on the body and connected to and for selectively moving said member among said positions, the combination with said member of an actuator carried by the body for movement between idle and operative positions; and means providing a force-transmitting connection between the shift member and the actuator and effective to transmit force from said member to said actuator when the member is moved to its park position so as to cause said actuator to move to its operative position, and said connecting means being effective in the opposite direction to transmit force from the operatively positioned actuator to the park-positioned member whereby said actuator is operative, when forcibly returned to its idle position, to shift the member out of its park position.

10. The invention defined in claim 9, including: a support portion on the body having an aperture therein; force-receiving means connected to the actuator and projectible through said aperture in the operative position of said actuator so as to facilitate manual operation of the actuator.

11. In a vehicle having a body and a change-speed transmission having a pair of shiftable elements, each capacitated to produce a driving speed ratio, a shift member mounted on the body for movement from a first position to a second position to shift one element to produce said ratio and for movement to a park position other than said first and second positions for shifting both elements to produce both ratios for locking the transmission against operation, and a shift controller movable on the body and connected to and for selectively moving said member among said positions, the combination with said member of an auxiliary release means mounted on the body and connected to the shift member for receiving manual force to move said member out of its park position.

References Cited in the file of this patent

UNITED STATES PATENTS 2,912,085     De Lorean _____ Nov. 10, 1959